Oct. 12, 1954  R. M. BEARD  2,691,408
ARMREST
Filed Aug. 25, 1952
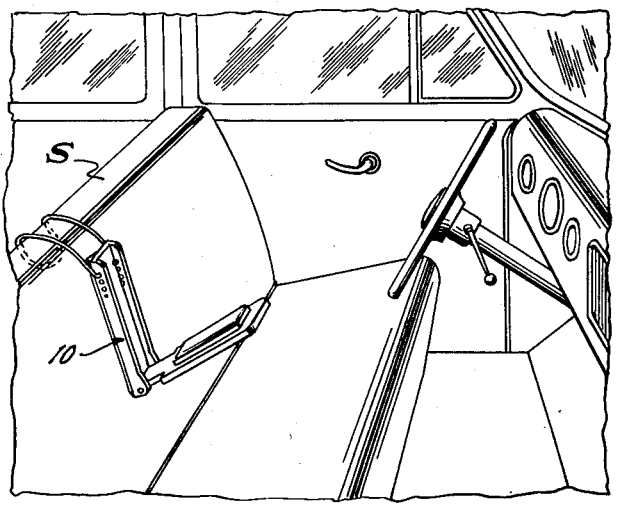
Fig. 1
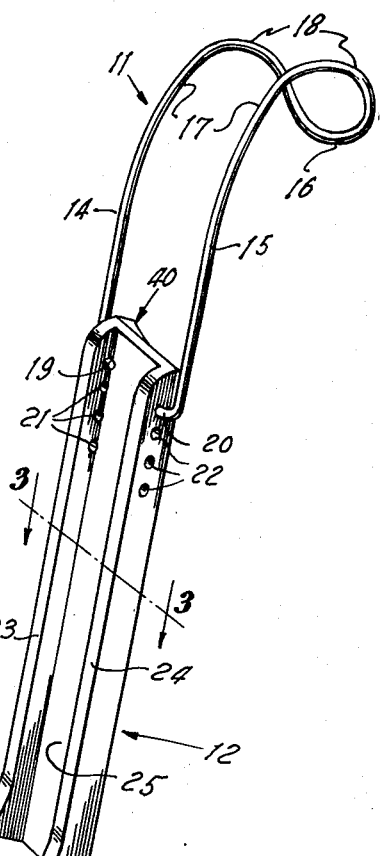
Fig. 2
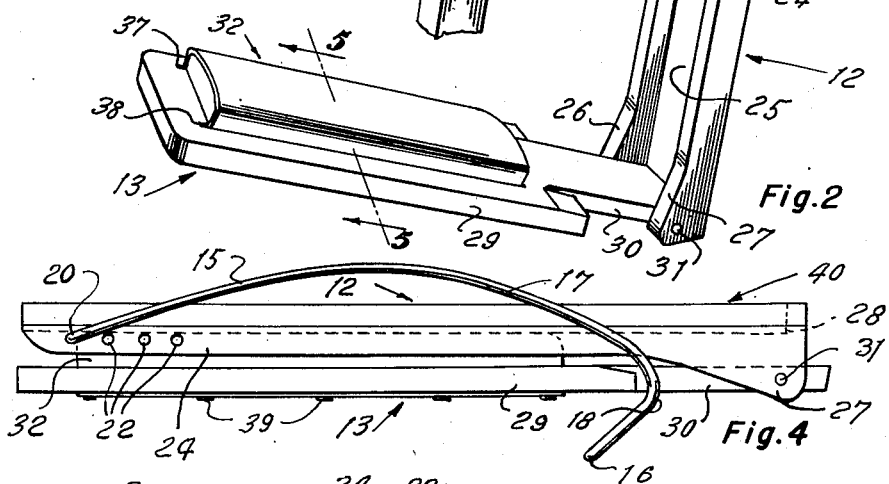
Fig. 3
Fig. 4
Fig. 5
RALPH M. BEARD
INVENTOR.
BY
ATTORNEY Patented Oct. 12, 1954

2,691,408

UNITED STATES PATENT OFFICE 2,691,408

ARMREST

Ralph M. Beard, Dallas, Tex.

Application August 25, 1952, Serial No. 306,233

6 Claims. (Cl. 155—112)

This invention relates to arms rests and more particularly to a portable adjustable arm rest for use in motor vehicles.

Motor vehicles are generally provided with an arm rest mounted on the inner side of the front door adjacent the operator for use by the operator to rest his left arm upon. No rest is provided for the right arm of the operator, which is therefore subject to fatigue, especially on long trips. It is thus desirable to provide an arm rest for the right arm of the operator which may be detachably secured to the front seat of the motor vehicle without any structural alteration of the seat or the driving of screws or the like into the seat, which is provided with means to prevent the arm rest from being displaced laterally away from the driver, which is adjustable vertically to adapt the arm rest for use by drivers having different physical characteristics, and which may be moved to an inoperative position while on the seat in which it does not interfere with the driver's movements.

Accordingly, it is one object of the invention to provide a new and improved arm rest for use in motor vehicles.

It is another object of the invention to provide a new and improved arm rest which may be detachably secured to a seat of a motor vehicle and which is provided with a means for preventing lateral displacement of the arm rest.

A further object of the invention is to provide a new and improved arm rest for motor vehicles which may be adjusted vertically to adapt the arm rest for use by operators having different physical characteristics.

A still further object of the invention is to provide a new and improved arm rest for motor vehicles which is movable to an inoperative position while attached to a seat of a motor vehicle.

Further objects and advantages of the invention will readily be apparent from the reading of the following description of a device constructed in accordance with the invention, and reference to the accompanying drawings thereof, wherein:

Figure 1 is a perspective view of the interior of a motor vehicle showing the arm rest in position on the front seat thereof, Figure 2 is an enlarged perspective view of the arm rest shown in Figure 1, Figure 3 is a fragmentary sectional view taken on the line 3—3 of Figure 1, Figure 4 is a side plan view of the arm rest when folded together for storage or shipment, and Figure 5 is a sectional view taken on the line 5—5 of Figure 2.

In the drawings the reference numeral 10 designates a preferred form of the arm rest, which includes a bracket 11 for engaging the top of a seat back, a support member 12 detachably and pivotally suspended from the bracket, and an arm support 13 pivotally secured to the support member. The bracket 11 comprises a pair of parallel spaced arms 14 and 15 which extend from a central connecting or bight portion 16 and are bent at 17 and 18 to form a hook and to conform to the top portion of the seat back S of a motor vehicle, so that the bracket may be hung thereon with the bight portion contacting the rear side of the seat back and the arms contacting the top and the front side of the seat back.

The free lower ends of the arms 14 and 15 of the bracket are bent inwardly to provide pivot pins or ears 19 and 20, respectively, which are adapted to engage in apertures 21 and 22, provided in laterally spaced flanges 23 and 24, respectively, of the support member 12 so that the support member may be pivotally suspended on the bracket. The spaced flanges of the support member extend perpendicularly from the web 25 thereof and are provided with ears or extensions 26 and 27 on their lower ends. The flanges extend beyond the lower edge 28 of the web.

The arm support 13 includes a base member 29 having a tongue portion 30 which extends between the ears 26 and 27 and is pivotally secured thereto by a pin or shaft 31. The inner end portion of the tongue is adapted to contact the lower edge 28 of the web 25 of the support member to the arm support extending outwardly at an angle from the support member when the arm support is pivoted about the pin 31 to operative position.

The arm support is provided with a pad 32 which may comprise a slab 33 of foam rubber or other suitable material retained in place and covered by a fabric or a plastic cover sheet 34 whose side flaps 35 and 36 extend through longitudinal slots 37 and 38, respectively, in the arm support and are overlapped along the bottom side of the arm support. The overlapped portions of the cover sheet 34 are secured to the arm support by tacks 39 or in any other suitable manner.

The pad 32 is of slightly greater width than the distance between the flanges 23 and 24 of the support member so that the sides of the pad will closely engage the flanges when the arm support is pivoted about the pin 31 into substantially parallel alignment with the support member. The resilient nature of the pad allows it to compress when squeezed between the flanges and then exert sufficient force to maintain the arm support in parallel alignment with the support member against the normal opening forces generated by vibrations when the vehicle is in motion. Thus, the arm support may be moved to a position in which it does not interfere with the normal use of the seat.

The arm rest 10 may have a tendency to move to the right when in operative position on the seat back S due to the vibrations of the seat when the vehicle is in motion and also to the forces exerted by the operator's arm. In order to prevent such movement, a triangularly shaped back strip 40 is secured to the back side of the support member along the edge of the support member farthest removed from the operator. The back strip has a short side 41 extending rearwardly at a relatively large acute angle in one direction from the support member and a long side 42 extending rearwardly at a relatively small acute angle in the opposite direction from the support member, so that the rearmost edge of the back strip tends to dig into the seat back and prevent movement of the support member away from the operator. The support member 12 and the arm support 13 are preferably made of wood while the bracket 11 is preferably made of a metal or other resilient substance.

In use, the bracket 11 is placed over the top of the seat back and the support member 12 is suspended therefrom by means of the ears 19 and 20 of the bracket, which are inserted into an aligned pair of apertures in the flanges of the support member. The arms 14 and 15 of the bracket may be pulled apart to disengage the ears from one pair of apertures and allowed to move back together to insert the ears in another selected pair of apertures whenever it is desired to adjust the vertical position of the arm support 13 on the seat back, to adapt the arm support to the physical characteristics of a particular operator. The support member may, of course, pivot about the ears 19 and 20 so that it will always lie flat against the seat back regardless of which pair of apertures the ears 19 and 20 are engaged in.

The arm support is then pivoted outwardly to the position shown in Figures 1 and 2, the contact between the tongue 30 and the lower edge 28 of the web holding the arm support projecting outwardly and slightly upwardly from the support member. The operator may now rest his right forearm on the pad 32 and thus relieve his right arm from fatigue. The back strip 40 will serve to hold the arm rest in the selected position on the seat back by preventing lateral movement of the arm rest along the seat back away from the operator.

If the operator decides to drive without the use of the arm rest, or if the arm support 13 obstructs the movement of the operator into or away from his driving position, the arm support 13 is pivoted upwardly to lie parallel to the support member and out of the way of the operator. The engagement of the resilient pad 32 between the side flanges, as well as the inclined position of the arm support when in folded position, will retain the arm support in this folded position against opening forces exerted thereon due to vibrations or shocks to which the vehicle is subjected when in motion.

When it is desired to remove the arm rest, the bracket 11 is removed from the seat back and pivoted down over the folded arm support and the support member to the position shown in Figure 4 so that the arm rest can be easily stored in a small space.

It will thus be seen that an arm rest 10 has been shown and described which includes a bracket 11 by means of which the arm rest may be detachably mounted on the seat back of an automobile, a support member 12 suspended from the bracket for vertical adjustment relative thereto, and an arm support pivotally connected to the support member and movable into an open position wherein it supports the arm of the operator and into a closed or folded position out of the way of the operator. It will also be apparent that the arm support will be retained in the folded position by the engagement of the pad 32 with the flanges 23 and 24 of the support member. Moreover, it will be seen that the back strip 40 on the support member prevents movement of the support member along the seat back away from the operator. Furthermore, it will be evident that the arm rest can be folded to occupy a very small space for storage or shipping.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. An arm rest comprising: a bracket having a pair of laterally spaced resilient arms adapted to extend over a seat back and down the front thereof, a support member having a plurality of longitudinally spaced apertures on its opposite edges; inturned pivot pins on the lower ends of the arms of the bracket selectively engageable and resiliently held engaged in said apertures of said support member whereby said support member is pivotally suspended from said arms and adapted to abut the front of the seat back; and an arm support pivotally connected to said support member for movement to an outward position wherein it projects forwardly from said seat back and to a folded position wherein it lies parallel to said support member.

2. An arm rest comprising: a bracket formed of an elongate continuous resilient strip bent into a hook at its upper end to engage over the back of a vehicle seat, said bracket being formed with a pair of spaced resilient arms provided with inturned ears at their lower ends; a supporting member having a plurality of vertically spaced apertures on its opposite edges for selectively receiving said ears whereby said support member may be suspended pivotally and vertically adjustable from said bracket to abut the front of said seat back; and an arm support pivotally connected to said support member for movement to an outward position wherein it projects forwardly from said seat back and to a folded position wherein it lies parallel to said support member, said resilient bracket arms resiliently holding said ears engaged in said apertures and permitting said ears to be selectively engaged in selected pairs of said spaced apertures of the supporting member to position the arm support at a desired elevation.

3. A arm rest comprising: a bracket formed of an elongate continuous resilient strip bent upon itself to provide a bight portion and a pair of spaced resilient arms, the bight portion of said bracket being formed into a hook at its upper end to engage over the back of a vehicle seat, said bracket having the lower ends of its spaced arms provided with inturned ears; an elongate supporting member having a web and a pair of laterally spaced flanges, said flanges being provided along their upper portions with a plurality of aligned vertically spaced pairs of apertures for selectively receiving said ears whereby said support member may be suspended pivotally and vertically adjustable from the lower ends of the resilient arms of said bracket to abut the front of said seat back; and an arm support pivotally connected to said support member for movement to an outward position wherein it projects forwardly from said seat back and to a folded position wherein it lies parallel to said support member, said resilient bracket arms resiliently holding said ears engaged in said apertures and permitting said ears to be engaged in selected pairs of said apertures to selectively position the arm support at a desired elevation.

4. An arm rest comprising: a bracket formed of an elongate continuous resilient strip bent upon itself to provide a bight portion and a pair of spaced resilient arms, the bight portion of said bracket being formed into a hook at its upper end to engage over the back of a vehicle seat; said bracket having the lower ends of its spaced arms provided with inturned ears; an elongate supporting member having a web and a pair of laterally spaced flanges; said flanges being provided along their upper portions with a plurality of aligned vertically spaced pairs of apertures for selectively receiving said ears whereby said support member may be suspended pivotally and vertically adjustable from the lower ends of the resilient arms of said bracket to abut the front of said seat back; an arm support pivotally connected to said support member for movement to an outward position wherein it projects forwardly from said seat back and to a folded position wherein it lies parallel to said support member; and a resilient pad on said arm support; said resilient pad engaging between said flanges when said arm support is in its folded position to retain said arm support in said folded position, said resilient bracket arms resiliently holding said ears engaged in said apertures and permitting said ears to be engaged in selected pairs of said apertures to selectively position the arm support at a desired elevation.

5. An arm rest comprising: a bracket formed of an elongate continuous resilient strip bent upon itself to provide a bight portion and a pair of spaced resilient arms, the bight portion of said bracket being formed into a hook at its upper end to engage over the back of a vehicle seat; said bracket having the lower ends of its spaced arms provided with inturned ears; an elongate supporting member having a web and a pair of laterally spaced flanges; said flanges being provided along their upper portions with a plurality of aligned vertically spaced pairs of apertures for selectively receiving said ears whereby said support member may be suspended pivotally and vertically adjustable from the lower ends of the resilient arms of said bracket to abut the front of said seat back; said flanges extending below the lower edge of said web; an arm support having a tongue extending between said flanges and pivotally secured thereto; said arm support being movable to an outward position wherein said tongue contacts said lower edge of said web to limit the outward movement of said arm support and to a folded position wherein it lies parallel to said support member; and a resilient pad on said arm support; said resilient pad engaging between said flanges when said arm support is in its folded position to retain said arm support in said folded position, said resilient bracket arms resiliently holding said ears engaged in said apertures and permitting said ears to be engaged in selected pairs of said apertures to selectively position the arm support at a desired elevation.

6. An arm rest comprising: a bracket formed of an elongate continuous resilient strip bent upon itself to provide a bight portion and a pair of spaced resilient arms, the bight portion of said bracket being formed into a hook at its upper end to engage over the back of a vehicle seat; said bracket having the lower ends of its spaced arms provided with inturned ears; a supporting member having a plurality of vertically spaced apertures for selectively receiving said ears whereby said support member may be suspended pivotally and vertically adjustable from the lower ends of the resilient arms of said bracket to abut the front of said seat back; an arm support pivotally connected to said support member for movement to an outward position wherein it projects forwardly from said seat back and to a folded position wherein it lies parallel to said support member; and an elongate back strip on the back of said support member extending continuously vertically along one side edge thereof and having a substantially triangular cross section for engaging said seat back to prevent lateral movement of said support member on said seat back, said resilient bracket arms resiliently holding said ears engaged in said apertures and permitting said ears to be engaged in selected pairs of said apertures to selectively position in the arm support at a desired elevation.

References Cited in the file of this patent

UNITED STATES PATENTS

| Number | Name | Date |
| --- | --- | --- |
| 822,472 | Perkins | June 5, 1906 |
| 1,010,812 | Shuttleworth | Dec. 5, 1911 |
| 1,378,704 | McPartland | May 17, 1921 |
| 1,964,500 | Breiding et al. | June 26, 1934 |
| 2,500,881 | Stader | Mar. 14, 1950 |
| 2,516,265 | Shulman | July 25, 1950 |

FOREIGN PATENTS

| Number | Country | Date |
| --- | --- | --- |
| 21,215 | Australia | Dec. 19, 1935 |